(12) United States Patent
Friedrich

(10) Patent No.: US 6,227,752 B1
(45) Date of Patent: May 8, 2001

(54) FAILSAFE WELD-FREE METHOD OF JOINING TUBULAR ELEMENTS

(75) Inventor: Paul Friedrich, Ventura, CA (US)

(73) Assignee: DA International, Ltd., Hewlett, NY (US)

( * ) Notice: Subject to any disclaimer, the term of this patent is extended or adjusted under 35 U.S.C. 154(b) by 0 days.

(21) Appl. No.: 09/442,057

(22) Filed: Nov. 16, 1999

(51) Int. Cl.[7] .......................................... F16B 7/04

(52) U.S. Cl. ........................ 403/192; 403/234; 403/260

(58) Field of Search ................................ 403/190, 191, 403/192, 187, 230, 233, 235, 241, 260, 286, 403, 231, 408.1; 256/65

(56) References Cited

U.S. PATENT DOCUMENTS

| | | | |
|---|---|---|---|
| 1,264,227 | * | 4/1918 | Uhl ........................................ 403/235 |
| 1,460,928 | * | 7/1923 | Tilden ............................... 403/260 X |
| 1,840,048 | * | 1/1932 | Michelman ............................. 403/13 |
| 2,303,309 | * | 11/1942 | McArthur ............................. 403/191 |
| 2,647,000 | | 7/1953 | Colley . |
| 3,107,900 | * | 10/1963 | De Paolo ............................... 256/65 |
| 3,333,873 | | 8/1967 | Triplett . |
| 3,353,852 | | 11/1967 | Wood . |
| 3,598,433 | * | 8/1971 | Savickas ............................. 403/190 |
| 3,864,051 | | 2/1975 | Reid . |
| 3,891,334 | * | 6/1975 | Loikitz ............................ 403/192 X |
| 3,985,460 | | 10/1976 | Piper et al. . |
| 4,013,372 | | 3/1977 | Lay et al. . |
| 4,017,199 | | 4/1977 | Strassle . |
| 4,039,263 | | 8/1977 | Bassler . |
| 4,248,418 | * | 2/1981 | Friedberg ......................... 403/189 X |
| 4,261,665 | * | 4/1981 | Hsiung ................................ 403/231 |
| 4,294,561 | | 10/1981 | Chapman et al. . |
| 4,355,919 | | 10/1982 | Lievonen . |
| 4,386,870 | | 6/1983 | Baroody . |
| 4,484,832 | | 11/1984 | Weissenburger . |
| 4,490,064 | | 12/1984 | Ducharme . |
| 4,603,996 | | 8/1986 | Chen . |
| 4,695,179 | | 9/1987 | Schnell . |
| 4,752,979 | | 6/1988 | Goacher, Sr. . |
| 4,761,093 | * | 8/1988 | Seymour ........................... 403/234 X |
| 4,779,885 | * | 10/1988 | Zinn ................................. 403/191 X |
| 4,784,511 | | 11/1988 | Greene . |
| 4,810,144 | | 3/1989 | Martelli . |
| 4,828,324 | * | 5/1989 | Putnam ............................ 403/192 X |
| 4,846,600 | | 7/1989 | Strand . |

(List continued on next page.)

FOREIGN PATENT DOCUMENTS

| | | | | |
|---|---|---|---|---|
| 819147 | * | 10/1951 | (DE) ..................................... 403/190 |
| 2420688 | * | 11/1975 | (DE) ..................................... 403/230 |
| 2243660 | * | 11/1991 | (GB) ..................................... 403/191 |
| 666326 | * | 8/1964 | (IT) ....................................... 403/190 |

Primary Examiner—Harry C. Kim
(74) Attorney, Agent, or Firm—Lackenbach Siegel Marzullo Aronson & Greenspan, P.C.

(57) ABSTRACT

A failsafe weld-free method of joining tubular elements provides for connecting a first tubular element to a second tubular element. The assembly includes an insert, with screw threads, inside of the first tube, a connector fitting for mounting to the insert within the first tube by a screw, a second tube is secured to the connector fitting with a fastener through a transverse hole through both the second tube and the connector fitting. When the connector fitting is assembled to the first tubular section and the connecting screw is tightened, a structurally rigid connection is achieved. The second tubular section is positioned over the stepped outside diameter of the connector fitting, aligning the transverse holes. A fastener is installed through the transverse hole. The fastener that secures the connector fitting to the second tubular section is positioned to not allow the screw fastening the connector fitting to the first tubular section to disengage or loosen. The resulting joint is structurally rigid in all planes without a visible fastener on the first tubular section with no distortion to the tubing due to bolt torque.

19 Claims, 6 Drawing Sheets

U.S. PATENT DOCUMENTS

| | | |
|---|---|---|
| 4,921,370 | 5/1990 | Handler et al. . |
| 4,923,322 | 5/1990 | Burg . |
| 5,011,175 | 4/1991 | Nicholson et al. . |
| 5,308,147 | 5/1994 | Tseng . |

* cited by examiner

FAILSAFE WELD-FREE METHOD OF JOINING TUBULAR ELEMENTS

BACKGROUND OF THE INVENTION

1. Field of the Invention

This invention relates to a failsafe weld-free weldless method of joining tubular elements and the connector fitting assembly for carrying out the method. The tubes, inserts and connector fittings used are not size, shape or material specific.

2. Description of the Prior Art

A variety of household and industrial products are fabricated from tubing. Such products include but not limited to, disability aids, metal furniture, serving carts, display units, scaffolding, etc.

Frequently tubular products are brazed or welded to ensure a strong joint. Some of these products include disability aids such as wheelchairs and walkers. Fatigue failures are common in these products at the heat-effected zone of the braze/weld joints. Clamping is another method of joining tubular elements. Tube clamping eliminates some of the problems associated with welded/brazed joints but is more expensive to execute and is not as aesthetically pleasing as utilizing connector fittings. Examples of clamping designs are diclosed U.S. Pat. Nos. 5,253,888, 4,294,561 and 4,039,263. The use of connector fittings greatly increases the structural strength and durability of the tubular joint, provides a failsafe connection and reduces fatigue failure. The connector fitting allows for easy component replacement, modular construction and product customization.

Tube connectors developed for rigidly joining tube sections in such products include compression fittings, as disclosed in U.S. Pat. Nos. 4,921,370 and 3,985,460, that do not positively lock in the inside diameter of one of the tubes and may rotate axially. Other types of tubular connector are described in U.S. Pat. Nos. 4,846,600 and 4,752,979. This design uses an eye bolt type fastener, a notched tube member and a screw to hold the assembly together. With this design, the tubes may distort when the screws are tightened securely and the joint may loosen over time. A design that uses a formed sheet metal nut that is pressed into the inside diameter of a tubular member is disclosed in U.S. Pat. No. 4,810,144. This design relies on spring tension of the teeth of the nut to grip the inside diameter of the tube when a screw is tightened. There is no positive locking, the nut may loosen and/or rotate within the tube. Another disadvantage of all three patented types described above is that the screw attached to the first tube section goes through one or both walls of the tube. This increases stress and deformation of the tube and leaves a screw head showing at the front of the tube. It is possible to crush or deform the tube by the action of substantial forces acting on the tubular walls when the screw is tightened.

SUMMARY OF INVENTION

The primary objective of the invention is to provide a simple, strong, durable weldless connector fitting assembly used to join two tubular members.

It is also an object of the present invention to provide a weldless tube connector that does not have the disadvantages inherent in the prior art tube connectors.

It is another object of the invention to provide a weldless tube connector that is simple in construction and economical to manufacture.

It is still another object of the invention to provide a weldless tube connector that is simple and convenient to assemble.

It is yet another object of the invention to provide a weldless tube connector that minimizes or totally eliminates radial distortion in the connected tubes.

It is a further object of the invention to provide a weldless tube connector that results in a reliable connection between tubes joined to each other at various angles.

It is still a further object of the invention to provide a weldless tube connector that greatly reduces fatigue failures between connected tube members.

It is yet a further object of the invention to provide a weldless tube connector that facilitates modular construction and product customization.

It is an additional object of the invention to provide a weldless tube connector that provides a weldless construction with high structural strength between hollow tubular members.

It is yet an additional object of the invention to provide a weldless tube connector that can be assembled by lay persons with conventional tools.

It is still an additional object of the invention to provide a weldless tube connector that is lighter in weight and requires fewer fasteners to assemble, reducing costs of assembly, weight and assembly time.

It is another object of the invention to provide a tubular assembly free of tube distortion at fastening points.

It is yet another object of this invention to provide a fail safe feature in tubular assemblies capturing an internal fastener by use of a transverse fastener.

It is another object of this invention to provide a weldless tubular assembly where one of the two joined tube members has no visible fastener.

It is yet another object of this invention to provide a tubular assembly that can join a tubular element of any shape to either another tubular element or to a solid element of any shape.

In order to achieve the above objects and others that will become apparent hereafter a failsafe weld-free weldless method of joining tubular elements in accordance with the invention includes the use of a first elongated cylindrical member defining a first axis and having a substantially uniform cross section defining a predetermined outer surface. A second elongated member defines a second axis and has at least one tubular end. Connector means is provided for interfacing with said predetermined outer surface for detachably connecting one end of said second member to an intermediate portion of said first cylindrical member and preventing rotation of each of said cylindrical members about their respective axes when assembled and for preventing radial forces from being applied solely to a localized region of at least one outer surface portion of either one of said members.

An example of an apparatus for forming rigid joints coupling lengths of tubular stock together includes a first tubular section or length of pipe to which a second tubular section or length of pipe is to be joined. A singular hole is provided through one wall. The second tubular section or length of pipe has a hole through both walls. A third component of the invention is a plug that is either threaded or has a captured nut. The last component is a connector fitting. The first end of the connector fitting has a radius that is complementary to the outside diameter of the first tubular section. A hole for a connecting screw runs through the centerline axis of the fitting. The opposite end of the fitting has a counterbore along the axis that allows for clearance to the screw head and a shoulder for the screw head to rest on. This opposite end has an outside diameter that is a close fit to the inside diameter of the second tubular section. A transverse hole is positioned in the fitting.

The insert is positioned into the first tubular section, aligning the threaded hole with the singular hole in the tubular section. A screw is inserted into the connector fitting, with the head of the screw resting on the shoulder of the counterbore. The screw is inserted into the threaded hole of the insert and tightened securely. The second tubular section is then installed over the opposite end of the connector fitting, aligning all through holes. A fastener is placed through the holes to capture the connector fitting with the second tubular section. Should the screw in the insert loosen, it still cannot disengage due to the position of the through holes.

The tubular sections are not limited to specific material, shape or size. The insert and connector fitting may vary in size and shape and may be machined, cast or molded and may be of various materials. The angle of engagement is not limited to 90 degrees (perpendicular). The fastener may be of various types such as screw and nut, sex bolt, spring pin or rivet.

The proposed connector fittings allows for weldless construction, high structural strength, increased durability, smaller packaging requirements, less inventory space and the ability to readily and relatively easily assemble a product with common, conventional tools by a lay person who is not technically inclined or experienced in the assembly of tubular products.

BRIEF DESCRIPTION OF DRAWINGS

The invention will now be described, merely by way of nonlimiting examples, with reference to the attached drawings in which like reference numerals refer to like parts as illustrated in the different figures.

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

Figure 1:
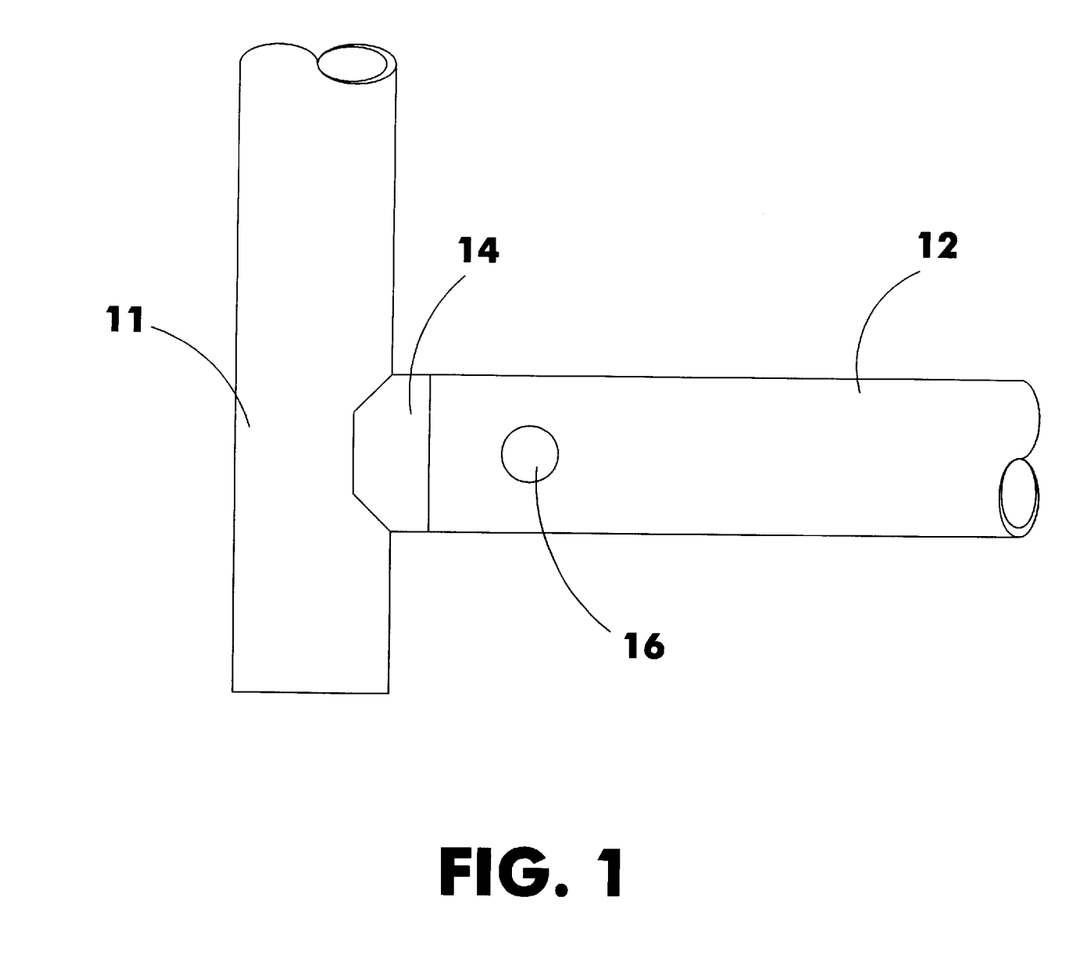
FIG. 1 is a fragmentary, side elevation view of first and second tubular sections connected together with a connector assembly of the present invention.
Figure 2:
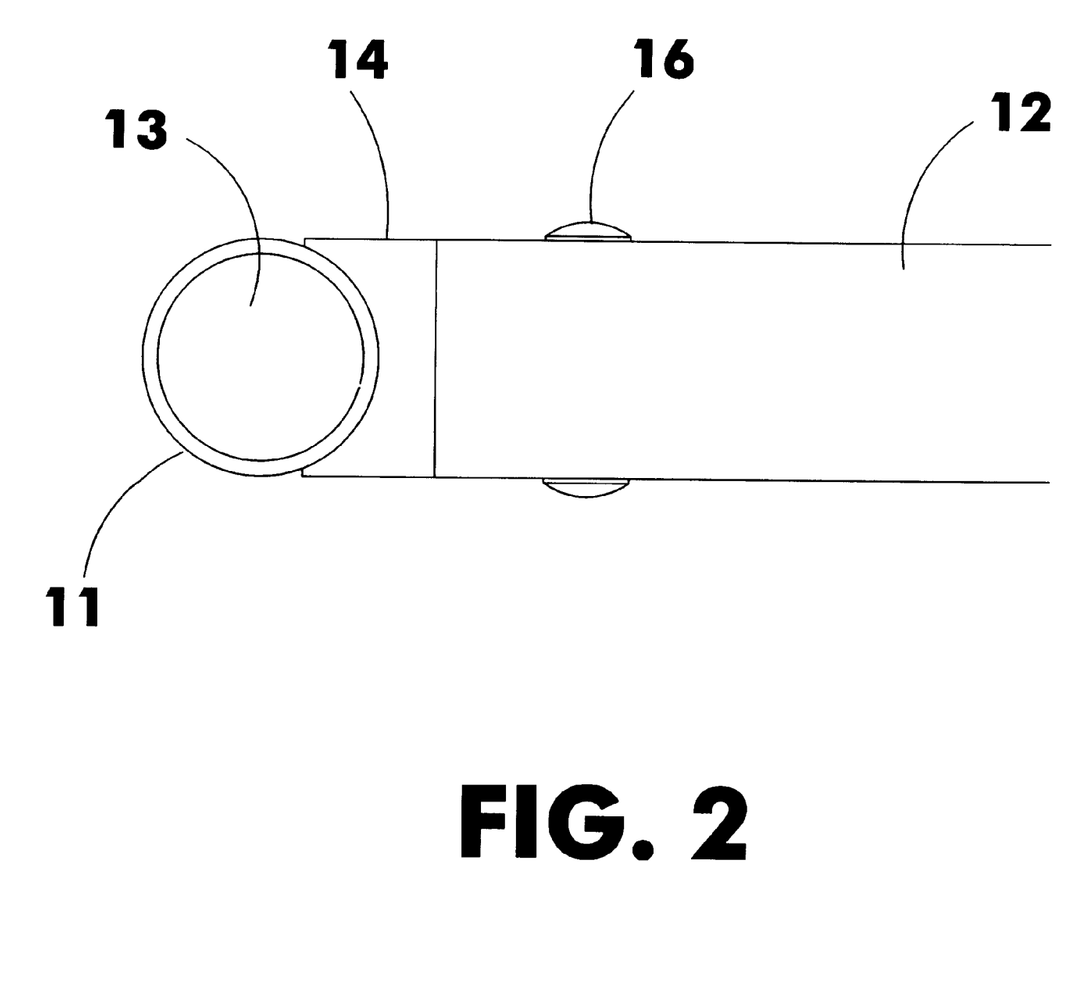
FIG. 2 is a fragmentary, top plan view of first and second tubular sections connected together with a connector assembly of the present invention.
Figure 6:
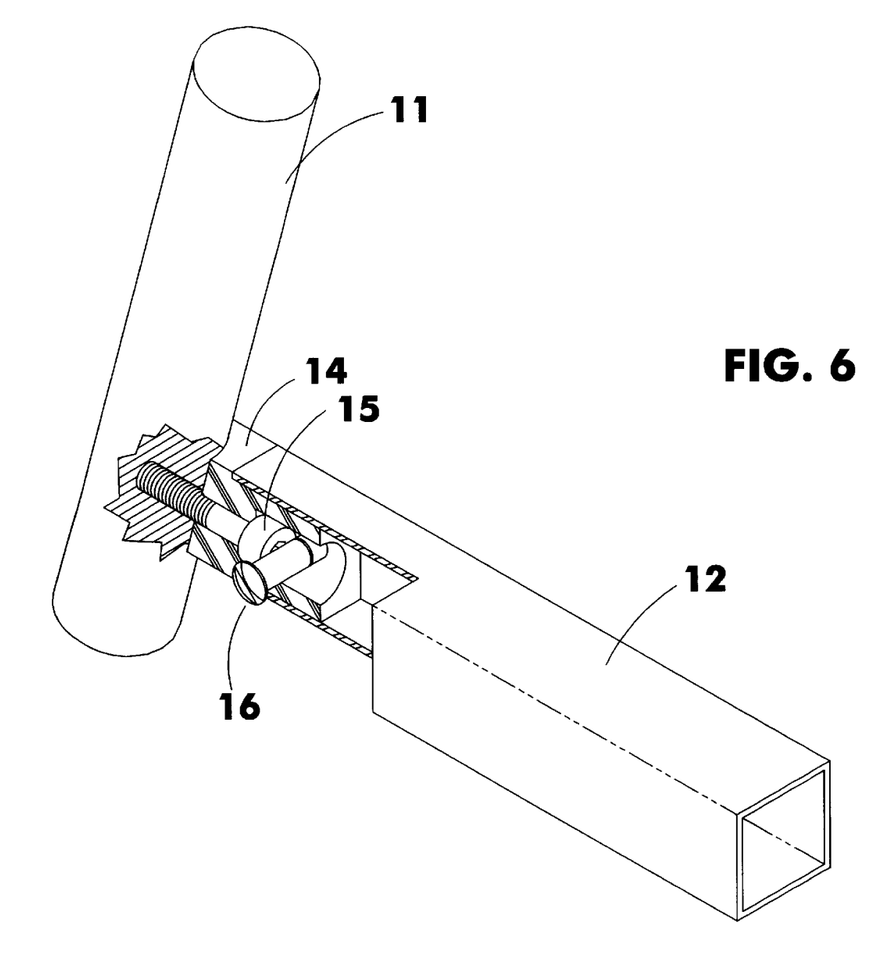
FIG. 6 is a cross-sectional perspective view illustrating a solid round bar section connected to a square hollow tube at an angle other than perpendicular in accordance with the present invention.

Referring now to the FIG. 1 and FIG. 2, the present invention is adapted for use in joining or connecting a first tubular section 11 to a second tubular section 12 wherein at least the second tubular section 12 is hollow. The tubular members define an axis a between their axes (FIG. 1). Typically, the first tube section 11 would also be hollow, but the present invention may be used where the first tube section is solid. Further, the present invention is illustrated as being used with cylindrical tube sections, which are most commonly used in fabricating conventional tubing products. However, the present invention may be adapted to connect or join noncylindrical tubular sections, such as a square tube shown in FIG. 6. This invention also includes an insert 13 (inside of first tube 11) with either a threaded hole or a hole with a captured nut, a connector fitting 14, a screw 15 and a fastener 16.

Figure 3:
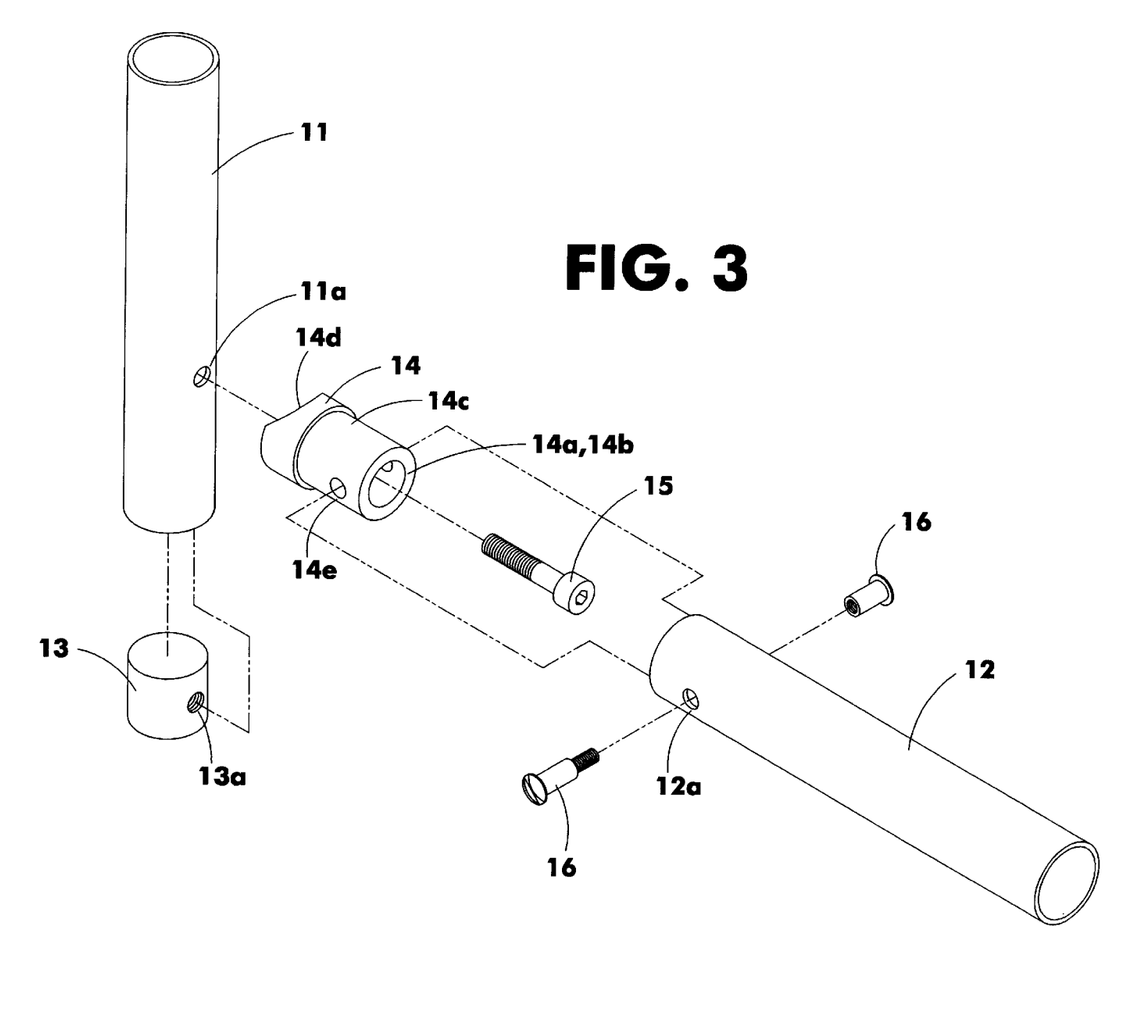
FIG. 3 is a fragmentary, exploded perspective view of the connector assembly used in FIGS. 1 and 2.
Figure 4:
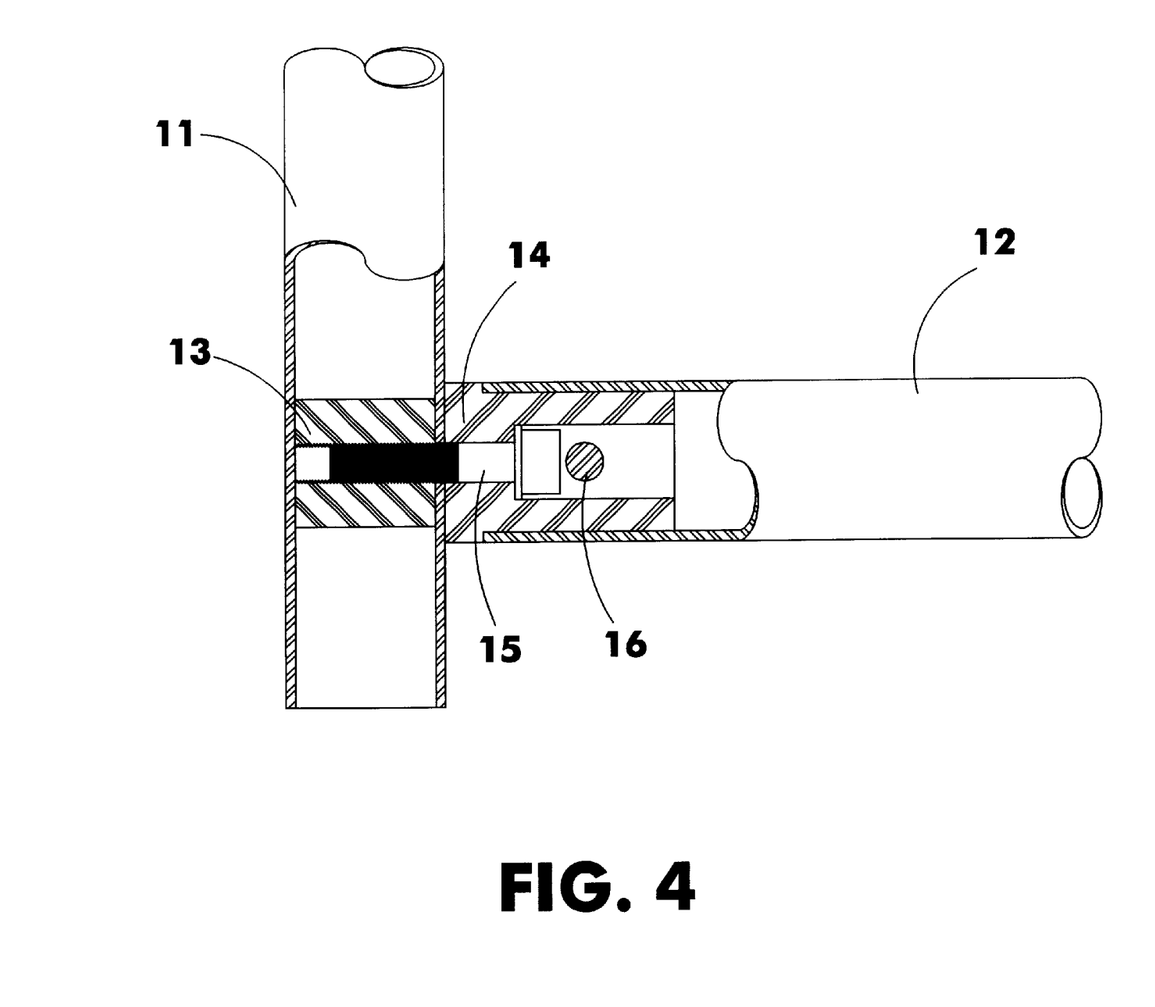
FIG. 4 is a cross-sectional view taken along line 4—4 in FIG. 2, illustrating a pair of tubular sections and component elements in accordance with the present invention.
Figure 5:
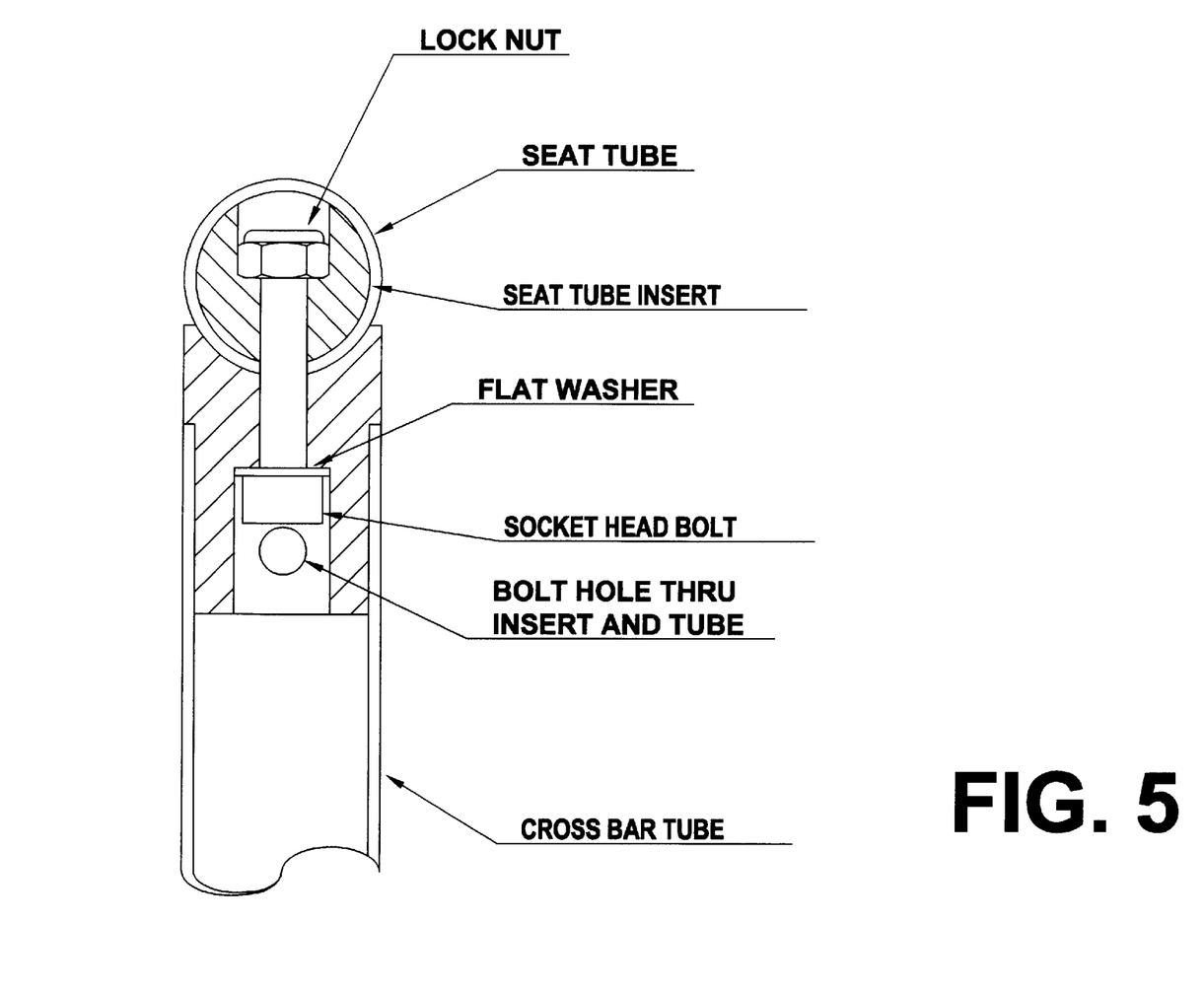
FIG. 5 is a cross-sectional view taken along line 5—5 of the tubular sections and component elements of FIG. 1

Referring now to FIGS. 3, 4 and 5, two tubular sections 11 and 12 are joined together in accordance with the present invention to form a corner joint. The tubular section 11 has a singular hole 11a through one wall on the axial centerline A of the tube. The second tubular section 12 has a diametrically opposite hole 12a through two walls. The insert 13 has a transverse threaded hole 13a or a hole with a captured nut on the axial centerline. The connector fitting 14 has a through hole 14a along the center axis, a counterbore 14b in line with the through hole, a reduced outside diameter 14c with a shoulder, a formed radius 14d on the end opposite the counterbore and a transverse through hole 14e on the center line. The insert 13 is installed into the first tube 11. In a solid bar 11s (see FIG. 6) a blind, tapped hole 13a would eliminate the need for a threaded insert). The holes 11a and 13a are aligned. A screw 15 is inserted into the connector fitting 14, through the hole 14a resting on the shoulder of the counterbore 14b and screwed securely into the threads 13a of the insert 13. Second tubular section 12 is installed over the reduced outside diameter 14c of the connector fitting 14, aligning the through holes 12a and 14e. A fastener 16 is installed securely through the holes. When assembled, the connection creates a strong, rigid and secure structure in all planes with only one visible fastener. A mechanical safety feature is created when the fastener 16 is installed into the transverse through holes 12a and 14e. The head of the screw 15 is captured in the counterbore 14b of the connector fitting 14 by the counterbore shoulder and the fastener 16. The screw 15 cannot be removed from the insert 13 without first removing the fastener 16.

The present invention has the following advantages by providing:

(1) A connector assembly that prevents rotation of each of two tubular members about their respective axes when assembled and prevents radial forces from being solely applied to at least one outer surface portion of either one of these members.

(2) A connector assembly that provides a substantial increase in structural strength and durability as compared to welded or brazed joints.

(3) A connector assembly that joins tubes distortion-free notwithstanding torque and/or other forces applied by the fasteners.

(4) A connector assembly that uses screws for securing the connector fitting to the first tubular section, which is captured internally to prevent accidental disassembly.

(5) A connector assembly that uses structurally rigid assemblies that may be modularly constructed in such a way as to allow for easy convertibility and/or customization by a lay person utilizing simple hand tools.

(6) A connector assembly that can use tubular sections of various shapes and sizes that may be structurally and rigidly assembled and disassembled.

(7) A connector assembly that avoids visible fasteners on or at the first tubular section.

(8) A connector assembly that provides a tubular section that is constrained radially in respect to the second tubular section.

While this invention has been described in detail with particular reference to preferred embodiments thereof, it will be understood that variations and modifications will be effected within the spirit and scope of the invention as described herein and as defined in the appended claims.

What I claim is:

1. A connector assembly comprising first elongated cylindrical member defining a first axis and having a substantially uniform cross section defining a predetermined outer surface; a second elongated member which defines a second axis and has at least one tubular end; connector means formed with an axial hole and an axial counterbore dimensioned to engage a fastener extending through said axial hole and said first elongated cylindrical member and having a threaded free end disposed within the first elongated cylindrical member for rigidly retaining said first elongated member only when said fastener is maintained in a tightened condition against said counterbore for interfacing with said predetermined outer surface for detachably connecting one end of said second member to an intermediate portion of said first cylindrical member and preventing rotation of each of said members about their respective axes when assembled and for preventing radial forces from being applied solely to a localized region of at least one outer surface portion of either one of said members; and failsafe means extending through said counterbore for inhibiting axial movement of the fastener away from said counterbore resulting in loosening and disconnection of said one end of said second member from said intermediate portion of said first cylindrical member.

2. A connector assembly as defined in claim 1, wherein at least one of said members has a circular cross section.

3. A connector assembly as defined in claim 1, wherein at least one of said members has a rectangular cross sections.

4. A connector assembly as defined in claim 1, wherein said first and second members have circular cross sections.

5. A connector assembly as defined in claim 1, wherein said first and second member have circular and rectangular cross sections, respectively.

6. A connector assembly as defined in claim 1, wherein said first cylindrical member comprises a solid rod.

7. A connector assembly as defined in claim 1, wherein both said first and second members comprise hollow tubular members each having a wall thickness substantially less than a minimum radial dimension of said uniform cross sections.

8. A connector assembly as defined in claim 1, wherein said first cylindrical member comprises a hollow tubular member having a wall of relatively thin thickness and said fastener extends through said wall, and a plug receivable within said hollow tubular member positioned to engage said fastener for distributing radial forces applied by said fastener over a substantial surface portion of said wall in the region of said fastener.

9. A connector assembly as defined in claim 8, wherein said plug has a substantially uniform cross section that substantially corresponds to said uniform cross section of said first tubular member to internally contact said wall substantially about the entire circumferential periphery of said wall to transfer stresses from said fastener to said plug and to a major portion of said wall in the region of said fastener.

10. A connector assembly as defined in claim 9, wherein said first cylindrical member has a circular cross section and said plug has a circular cross section and having a diameter substantially equal to the inside diameter of said first cylindrical member.

11. A connector assembly as defined in claim 8, wherein said fastener is a threaded bolt and said plug has a hole threaded to receive said bolt through a hole in said wall of said first cylindrical member.

12. A connector assembly as defined in claim 1, wherein said axes of said members form an angle $\alpha$ therebetween.

13. A connector assembly as defined in claim 1, wherein said first cylindrical member includes means for engaging said fastener, and said connector means comprises an elongate fitting defining an axis and having said axial hole and said counterbore along said axis dimensioned to receive said fastener, one axial end of said fitting being formed to mate with said predetermined outer surface of said first cylindrical member and having an opposing axial end configured to be received with minimal clearance within said at least one tubular end of said second member, said opposing axial end being secured to said at least one tubular end to prevent relative axial movements of said fitting and said second member along their respective axes, said fastener being a threaded fastener having a head portion located at a predetermined position within said second member when said fastener is fully advanced in the direction of said first cylindrical member to provide a secure connection between said first and second members to each other, said failsafe means comprising a transverse fastener extending through aligned holes in said fitting and walls of said at least one tubular end and through said counterbore to position said transverse fastener in close proximity with said head portion to provide an interference contact when said threaded fastener rotates and moves away from said first member in a direction tending to disconnect said members from each other.

14. A connector assembly as defined in claim 1, wherein said first cylindrical member includes means for engaging said fastener, and said connector means comprises an elongate fitting defining an axis and having said axial hole along said axis dimensioned to receive said fastener, one axial end of said fitting being formed to mate with said predetermined outer surface of said first cylindrical member and having an opposing axial end configured to be received with little clearance within said at least one tubular end of said second member, said opposing axial end being secured to said at least one tubular end to prevent relative axial movements of said fitting and said second member along their respective axes, and wherein said axial ends of said fitting and said at least one tubular end are circular.

15. A connector assembly as defined in claim 1, wherein said first cylindrical member includes means for engaging said fastener, and said connector means comprises an elongate fitting defining an axis and having said axial hole along said axis dimensioned to receive said fastener, one axial end of said fitting being formed to mate with said predetermined outer surface of said first cylindrical member and having an opposing axial end configured to be received with little clearance within said at least one tubular end of said second member, said opposing axial end being secured to said at least one tubular end to prevent relative axial movements of said fitting and said second member along their respective axes, and wherein said fastener comprises a bolt having a head at one end and being threaded at the other.

16. A failsafe weld-free method of joining tubular elements including a first elongated cylindrical member defining a first axis and having a substantially uniform cross section defining a predetermined outer surface and a second elongated member which defines a second axis and has at least one tubular end, the method comprising the steps of forming an axial hole and an axial counterbore in said second elongated member; extending an axial first fastener through said axial hole and said first elongated cylindrical member and having a threaded free end disposed within the first elongated cylindrical member for rigidly retaining said first elongated member only when said fastener is maintained in a tightened condition against said counterbore; interfacing with said predetermined outer surface for detachably connecting one end of said second member to an intermediate portion of said first cylindrical member and preventing rotation of each of said members about their respective axes when assembled and for preventing radial forces from being applied solely to a localized region of at least one outer surface portion of either one of said members; and failsafe means including a transverse fastener extending transversely through said second elongated member and said counterbore to block axial movements of said first fastener away from said counterbore resulting in loosening and prevent said first fastener from separating from said first elongated member.

17. A method as defined in claim 16, wherein said interfacing step comprises the steps of positioning a plug within said first cylindrical member and extending said first fastener through the wall of said first cylindrical member to engage said plug.

18. A method as defined in claim 17, wherein said plug is selected which substantially fills at least a portion of said first cylindrical member in which it is positioned, whereby radial forces applied by said first fastener are distributed over a substantial surface portion of said wall in the region of said first fastener.

19. A method according to claim 18, wherein said plug is provided with a substantially uniform cross section that substantially corresponds to said uniform cross section of said first tubular member to internally contact said wall substantially about the entire circumferential periphery of said wall to thereby transfer stresses from said first fastener to said plug and to a major portion of said wall in the region of said first fastener.

* * * * *